(No Model.)

J. C. STEVENS.
INSECT TRAP.

No. 302,293. Patented July 22, 1884.

Witnesses:
Wm. A. Rosenbaum
J. R. Hunter

Inventor:
James C. Stevens
By J. W. Burris Atty.

N. PETERS, Photo-Lithographer, Washington, D. C.

UNITED STATES PATENT OFFICE.

JAMES C. STEVENS, OF KEITHSBURG, ILLINOIS.

INSECT-TRAP.

SPECIFICATION forming part of Letters Patent No. 302,293, dated July 22, 1884.

Application filed April 19, 1884. (No model.)

*To all whom it may concern:*

Be it known that I, JAMES C. STEVENS, a citizen of the United States of America, residing at Keithsburg, in the county of Mercer and State of Illinois, have invented certain new and useful Improvements in Insect-Traps, of which the following is a specification, reference being had therein to the accompanying drawings.

My invention relates to devices for destroying insects; and it consists of a case or frame having in the upper part a tank to contain liquid for drowning the insects, and in the lower part an open receptacle for a removable insect-trap, which trap is provided with a slide-bottom, a handle, and a plate with a turned-up flange to catch against a pin in the end of a set-screw inserted through the back of the case, for holding the trap in an inclined open position, all as hereinafter fully set forth.

Figure 1:
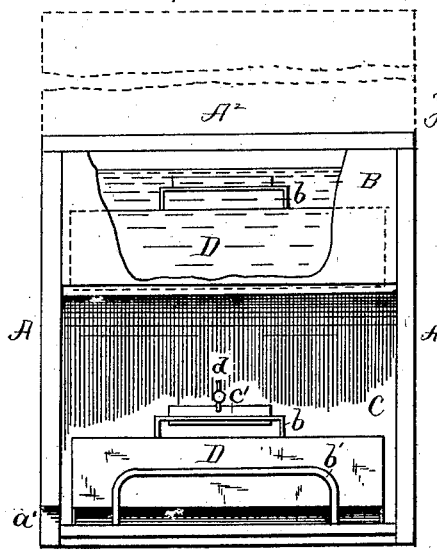
Figure 2:
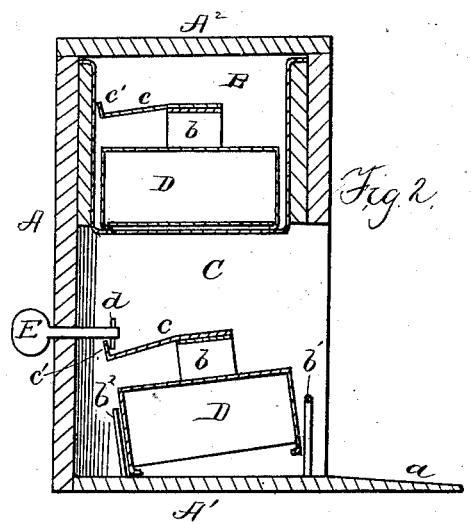
Figure 3:
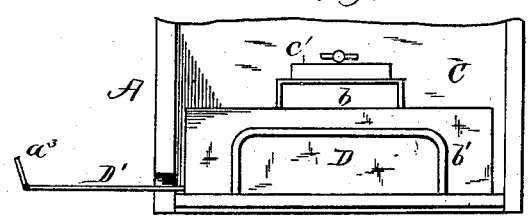
Figure 5:
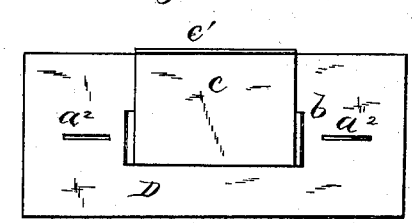
Figure 4:
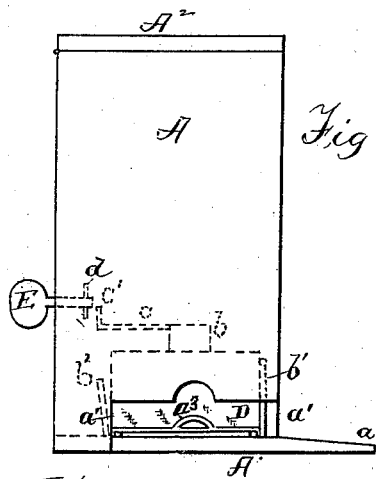
Figure 6:
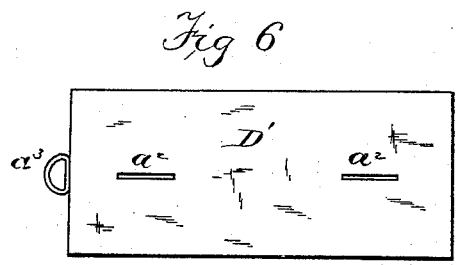

In the accompanying drawings, Figure 1 is a front elevation with the front wall of the tank partly broken away, showing the trap in the tank. Fig. 2 is a central transverse vertical section. Fig. 3 is a front view of the open receptacle with the trap inserted. Fig. 4 is an end elevation of the end having the opening for inserting the slide-bottom of the trap. Figs. 5 and 6 are plans of the top and bottom of the trap detached.

A designates the frame or outward case, the upper part of which is provided with a tank, B, for containing water or other liquid for destroying the insects, as hereinafter described. The case is provided with a bottom, A', extended in front, forming the platform $a$, for flies or other insects to light upon, and from which to be enticed into the trap by the usual baiting. The tank is provided with a hinged lid, $A^2$.

C designates an open receptacle for the insect-trap D. The lower edges of the side walls of the trap are turned inward, forming guides for the slide-bottom D', one end of which is provided with the ring $a^3$, serving as a handle for sliding the bottom in and out of the trap. One end of the casing is provided with an opening, $a'$, through which the slide-bottom may be inserted in its place in the trap when required to inclose the insects, as hereinafter explained. The top and bottom of the trap are provided with air-slits $a^2$, to allow the air to escape as the trap is being filled with liquid, when placed in the tank. The top of the trap is provided with the handle $b$, to which is soldered or otherwise fastened the plate $c$, extended to the rear edge of the trap, and its free end is turned up, forming the catch $c'$, to receive and hold against the pin $d$, inserted through the end of a set-screw, E, which has its bearing in the back wall of the casing. The bottom A' of the trap-receptacle is provided with a front guard-wire, $b'$, and two guard-pins, $b^2$—one near each end, in the rear part of the bottom—to hold the trap in place. The traps D being properly baited, one of them, with its bottom D' removed, is placed in the receptacle C, between the guard-wire and pins $b'$ $b^2$. The set-screw is adjusted in position by turning it in or out to place the pin $d$ the required distance from the front, and when the trap is to be placed in the receptacle the pin is placed in a horizontal position, and the trap is tilted backward to leave the proper size opening between the bottom of the front wall and the bottom A'. Then the set-screw is turned so as to place the pin $d$ in a vertical position, its lower part extending downward in front of the catch $c'$ of the plate $c$, thus holding the trap in the inclined open position, as seen in Figs. 1 and 2 of the drawings. When the trap is sufficiently filled with the insects, the set-screw is turned sufficiently for the pin to release the catch $c'$, allowing the trap to drop upon the bottom A', and the slide-bottom D' is then immediately inserted through the opening $a'$ into its place in the bottom of the trap, thus securely inclosing the insects. This trap is then removed from the receptacle C and placed in the tank B, and the other trap, D, with its bottom removed, is placed in the receptacle C, and secured in position to catch the insects, as described, while those in the other trap are being drowned in the tank; and thus as fast as the trap in the receptacle C becomes full of insects it is removed and placed in the tank, and the other trap is emptied of the dead insects and placed in the receptacle.

What I claim as new, and desire to secure by Letters Patent, is—

1. The combination, with the outer case, A, provided with the tank B, open receptacle C, and end opening, $a'$, of an inner trap, D, having a slide-bottom, D', and adapted to be placed in the receptacle and in the tank, substantially as and for the purposes described.

2. The combination of the outer case, A, having the receptacle C, the set-screw E, the pin $d$, an inner trap, D, and the catch $c'$, substantially as and for the purposes described.

3. The combination, with the outer case, A, having the tank B, receptacle C, and end opening, $a'$, of the set-screw E, pin $d$, trap D, having the slide-bottom D', and the catch $c'$, substantially as and for the purposes described.

In testimony whereof I affix my signature in presence of two witnesses.

JAMES C. STEVENS.

Witnesses:
JOHN O. BUTLER,
SIMON DARNELL.